P. DAIMLER.
TRACTIVE FORCE MEASURING APPLIANCE.
APPLICATION FILED NOV. 17, 1913.
1,136,511.
Patented Apr. 20, 1915.
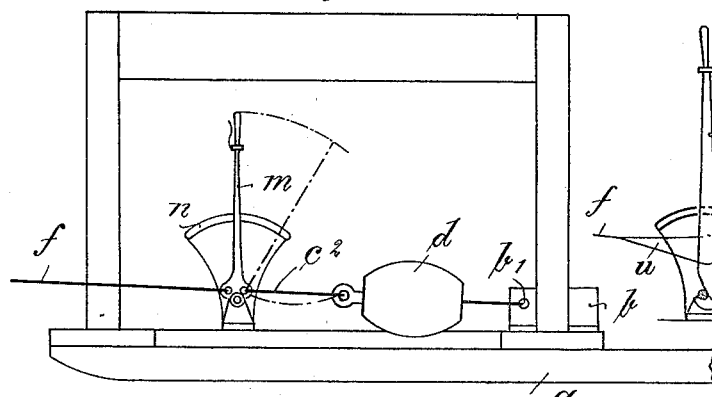
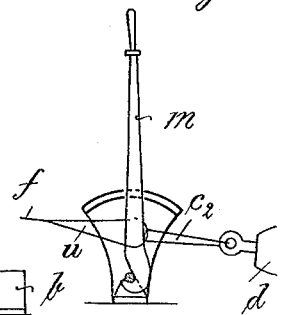
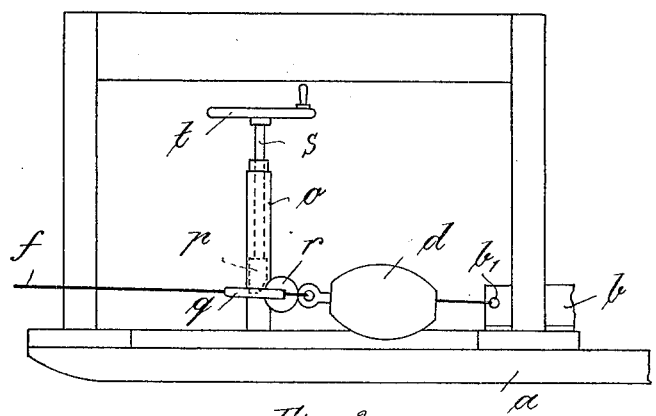
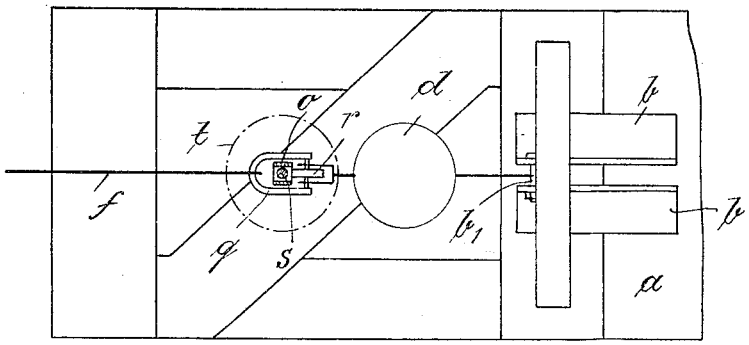
Witnesses:
S. C. McBride
Inventor.
Paul Daimler
by Foster Freeman Watson and
Attorneys.

UNITED STATES PATENT OFFICE.

PAUL DAIMLER, OF CANNSTATT, GERMANY, ASSIGNOR TO THE FIRM OF DAIMLER-MOTOREN-GESELLSCHAFT, OF UNTERTÜRKHEIM, GERMANY.

TRACTIVE-FORCE-MEASURING APPLIANCE.

1,136,511.

Specification of Letters Patent.

Patented Apr. 20, 1915.

Application filed November 17, 1913. Serial No. 801,508.

*To all whom it may concern:*

Be it known that I, PAUL DAIMLER, subject of the King of Wurttemberg, residing at 87 Waiblingerstrasse, Cannstatt, in the Kingdom of Wurttemberg, German Empire, have invented certain new and useful Improvements in Tractive-Force-Measuring Appliances, of which the following is a specification.

This invention relates to improvements in appliances for measuring the tractive force of traction motors of the class in which the load carrier or trailer is connected to the drawbar of the tractor through the intermediation of a dynamometer, the tractive force being indicated by the dynamometer.

According to the present invention means are provided for temporarily disconnecting the dynamometer from the tractor in order that the dynamometer shall not always be subjected to the pull of the tractor as, for example, when starting the tractor. For this purpose a device is mounted upon the trailer in the connection between the dynamometer and the tractor, this device being capable of adjustment so that the pull of the tractor may be transmitted to the trailer either through the dynamometer or through the adjustable device.

In order that the invention may be more clearly understood, reference is made to the accompanying drawings showing various embodiments of the invention by way of example.

Figure 1 is a side view of the trailer or sledge, the rear loaded part being broken away. Fig. 1ª is a detail view showing a slightly modified arrangement of the adjusting lever. Fig. 2 is a side view corresponding to Fig. 1 of a slightly modified arrangement, and Fig. 3 is a plan view of Fig. 2, partly in section.

The trailer as shown on the drawings comprises a wooden sledge $a$, the rear part of which (not shown) may be loaded as required. Near the front of the sledge is fixed a pair of angle irons $b$ through which is passed a pin $b^1$, to which the dynamometer $d$ is connected.

In the arrangement illustrated in Fig. 1, a lever $m$ is pivotally mounted on the sledge $a$ between the dynamometer and the tractor (not shown), the pivoted lever $m$ being connected by a preferably flexible connection $c^2$ to the dynamometer $d$ and to the tractor by means of the draw-bar $f$. In the position illustrated in Fig. 1 the lever $m$ is free to move so that the pull of the tractor will be transmitted to the dynamometer $d$. If the dynamometer is to be disconnected, the lever $m$ is drawn back into the position illustrated in dotted lines and secured in this position by means of a spring pin engaging a toothed sector in the usual manner, said sector being diagrammatically shown at $n$. By this means the connection $c^2$ between the lever and the dynamometer $d$ will be slackened, as indicated by the broken lines in Fig. 1, thus unloading the dynamometer. The pull of the tractor will then be transmitted to the sledge $a$ through the lever $m$.

As indicated in Fig. 1ª the connections may be so arranged that when the pull is transmitted to the dynamometer $d$, the lever $m$ will not be influenced. For this purpose the draw-bar $f$ terminates in a loop $u$ embracing the lever $m$, the loop $u$ being connected to the dynamometer $d$ by the flexible connection $c^2$.

In the modification illustrated in Figs. 2 and 3 a pillar $o$ is mounted on the sledge $a$ in front of the dynamometer and within this pillar is an adjustable thrust block $p$, preferably wedge-shaped, capable of being adjusted by means of a screwed spindle $s$ and hand wheel $t$. The draw-bar $f$ in this case is connected to a yoke $q$ which embraces the pillar $o$ and carries the bearing pins of a roller $r$ behind the pillar $o$, the bearing pins of the roller $r$ being also connected to the dynamometer $d$.

When the thrust block is raised the roller $r$ is adapted to enter a slot in the pillar $o$, so that the pull of the draw-bar $f$ is transmitted to the dynamometer $d$. If the thrust block $p$ is, however, screwed down, the roller $r$ will be pressed back, thus unloading the dynamometer $d$, whereupon the thrust block $f$ will take up the pull of the draw-bar $f$ and transmit it through the pillar $o$ to the sledge $a$.

It will of course be understood that instead of the adjustable lever $m$ or thrust block $p$, any other suitable mechanism may be provided for disconnecting the dynamometer $d$.

I claim:—

1. In an appliance for measuring the tractive force of traction motors, the combination with a tractor and trailer having a dynamometer interposed between them and a direct connection between said dynamometer and trailer, of an adjustable member, a connection between said member and the tractor, a flexible connection between said member and the dynamometer and adjustable means upon the trailer for temporarily securing said member in a position in which said flexible connection is slackened.

2. In an appliance for measuring the tractive force of traction motors, the combination with a tractor and trailer having a dynamometer interposed between them and a direct connection between said dynamometer and trailer; of a movable member, a connection between said member and the tractor, a flexible connection between said member and the dynamometer, a lever pivoted upon said trailer and adapted to move said member, and means for securing said lever in a position in which said member is so situated that said flexible connection is slackened.

3. An appliance for measuring the tractive force of traction motors comprising in combination a loaded trailer, a connection between said trailer and the tractor, a dynamometer in said connection, a lever pivoted to said trailer and connected to said tractor, a flexible connection between said lever and dynamometer, and means for securing said lever in a position in which said flexible connection is slackened.

In testimony whereof I have affixed my signature in presence of two witnesses.

PAUL DAIMLER.

Witnesses:
ROBERT UHLAND,
ERNEST ENTENMANN.

Copies of this patent may be obtained for five cents each, by addressing the "Commissioner of Patents, Washington, D. C."